United States Patent [19]

Seemann et al.

[11] Patent Number: 5,599,003
[45] Date of Patent: Feb. 4, 1997

[54] BISTABLE SOLENOID VALVE

[75] Inventors: Hans Seemann; Hans Ortner; Walter Pressler, all of Villach, Austria

[73] Assignee: Interelektrik Ges. m.b.H. & Co. KG, Villach, Austria

[21] Appl. No.: 416,776

[22] PCT Filed: Aug. 8, 1994

[86] PCT No.: PCT/EP94/02626

§ 371 Date: Apr. 7, 1995

§ 102(e) Date: Apr. 7, 1995

[87] PCT Pub. No.: WO95/04997

PCT Pub. Date: Feb. 16, 1995

[30] Foreign Application Priority Data

Aug. 10, 1993 [DE] Germany ............... 43 26 838.2

[51] Int. Cl.⁶ .................. F16K 31/12; F16K 31/02
[52] U.S. Cl. ................ 251/30.03; 251/38; 251/45; 251/129.2; 251/229
[58] Field of Search ............ 251/30.03, 38, 251/48, 46, 129.6, 129.2, 229, 230; 137/554; 361/154

[56] References Cited

U.S. PATENT DOCUMENTS

| | | | |
|---|---|---|---|
| 2,922,861 | 1/1960 | White . | |
| 3,220,695 | 11/1965 | Downey et al. | 251/230 |
| 4,283,040 | 8/1981 | Kolze | 251/38 X |
| 4,534,537 | 8/1985 | Zukausky | 251/45 X |
| 4,821,769 | 4/1989 | Mills et al. | 137/559 |
| 4,995,585 | 2/1991 | Gruber et al. | 251/30.03 |
| 5,053,911 | 10/1991 | Kopec et al. | 361/159 |
| 5,115,672 | 5/1992 | McShane et al. | 137/554 X |
| 5,228,469 | 7/1993 | Otten et al. | 137/554 X |
| 5,299,592 | 4/1994 | Swanson | 251/30.03 X |
| 5,456,448 | 10/1995 | Chou | 251/230 |

FOREIGN PATENT DOCUMENTS

| | | |
|---|---|---|
| 0120580 | 10/1989 | European Pat. Off. . |
| 0446770A1 | 9/1991 | European Pat. Off. . |
| 1464419 | 2/1969 | Germany . |
| 2620495.5 | 11/1976 | Germany . |
| 3605216 | 2/1986 | Germany . |
| 3624152 | 7/1986 | Germany . |
| 3810154A1 | 10/1989 | Germany . |
| 4103777A1 | 8/1992 | Germany . |

*Primary Examiner*—Hoang Nguyen
*Attorney, Agent, or Firm*—Collard & Roe, P.C.

[57] ABSTRACT

A bistable solenoid valve with an armature in the form of a movable core disposed within a core guide tube. The armature is resettable by a spring force with one single electromagnetic winding surrounding the tube. The movable core is mechanically coupled with a locking mechanism which is alternately engageable and releasable. A second locking member is longitudinally displaceable against a first member and, in its lifted position, is rotatable through a preset angle. The two locking members, as well as the spring and the movable core, are supported within the core guide tube and surrounded by the fluid medium. The core guide tube is open at one end facing the valve chamber and closed at the other end.

13 Claims, 7 Drawing Sheets

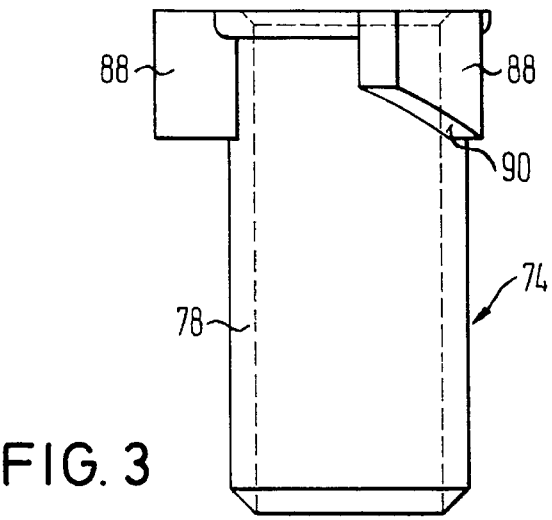
FIG. 3
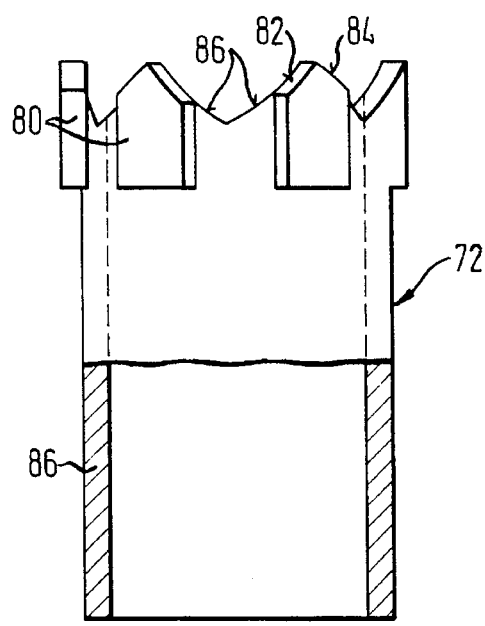
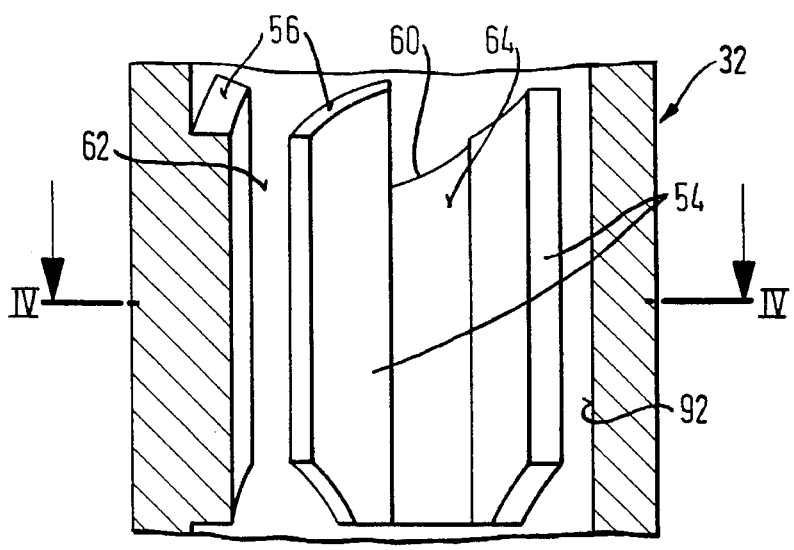

5,599,003

BISTABLE SOLENOID VALVE

BACKGROUND OF THE INVENTION

1. Field of the Invention

The invention relates to a bistable solenoid valve with a locking mechanism that alternates between two positions to open and close the valve.

2. The Prior Art

A bistable solenoid valve with an immersion core, which can be actuated by one single magnet winding and reset by spring force, is known from DE-OS 38 10 154, said immersion core being supported in a core guide tube connected with the controlled medium. The magnetic circuit contains a permanent magnet, the field of which is alternately intensified and weakened by successive dc-voltage switching pulses of different polarity. Such a solenoid valve, as opposed to a comparable monostable solenoid valve, has the advantage that it requires only short switching pulses in each case; that its energy consumption is low on account of said fact; and that accordingly, the amount of heat collected, which has to be taken into account for its design, is low as well, if not even negligible. On the other hand, the switching system of the aforementioned, known solenoid valve requires relatively great expenditure with respect to material and manufacture because it requires a balancing of forces and, therefore, relatively narrow tolerances to be complied with. Furthermore, the bipolar switching means required for its operation are relatively costly.

The invention is based on the problem of creating a solenoid valve that is simpler and can be manufactured at more favorable cost, accordingly, and which, furthermore, is extremely economical with respect to energy consumption.

A bistable electromagnetic switching system with one single magnet winding and an immersion core, the latter being resettable by spring force, is known already from DE-OS 1 464 419. Said system is to be preferably used for electric switches. For fixing the immersion core in the one of its two final positions, said switching system has an engageable and releasable locking mechanism with a first detent member guided lengthwise, and a second detent member displaceable lengthwise against the first detent member and rotatable in an overlift position around an angle graduation. A spiral pressure spring causes face-side cam gear rims of the two detent members to engage each other—in a way as similarly used in connection with some retractable pens.

The invention is based on the consideration that such a switching system according to aforementioned DE-OS 1 464 419 is, in connection with some additional measures, suitable for solving the above problem in a special way.

SUMMARY OF THE INVENTION

Therefore, according to the invention, said problem is solved by a bistable solenoid valve having a locking mechanism with two locking members and an axially-biasing spring which also resets the movable core into one of its two stable positions.

The use of a switching system of the known type specified in DES-OS 1 464 419, and accommodating in such a system the movable parts of the locking elements including the immersion core in the core guide tube, permit a positively smooth operation of the switching system, which is enhanced even further by using a single common spring within the core guide tube, such spring being surrounded by the medium as well. In this way, the respective solenoid valve is capable of functioning with a minimum amount of actuation energy, which makes it suitable in a special way for battery operation as well, for example in agricultural irrigation installations and remotely located cattle watering tank systems. This applies all the more if the valve is a servo-assisted valve. However, a bistable solenoid valve that is servo-assisted by the controlled medium is known already from DE-OS 41 03 777.

However, the claimed solenoid valve is, furthermore, structured in an extraordinarily simple way, and accordingly can be manufactured at favorable cost, which applies to the indicating circuit as well.

The switching system of the claimed solenoid valve can be basically designed with the same dimensions, and also as a module, like the one of comparable, known monostable solenoid valves, so that it can be readily substituted for the respective monostable switching system.

BRIEF DESCRIPTION OF THE DRAWINGS

Exemplified embodiments of the claimed solenoid valve and of the respective indicating circuit are described in the following in greater detail by reference to the figures, in which:

FIG. 3 shows an enlarged detail from FIG. 2, which shows details of the locking system more clearly;

DETAILED DESCRIPTION OF THE PREFERRED EMBODIMENT

Figure 1:
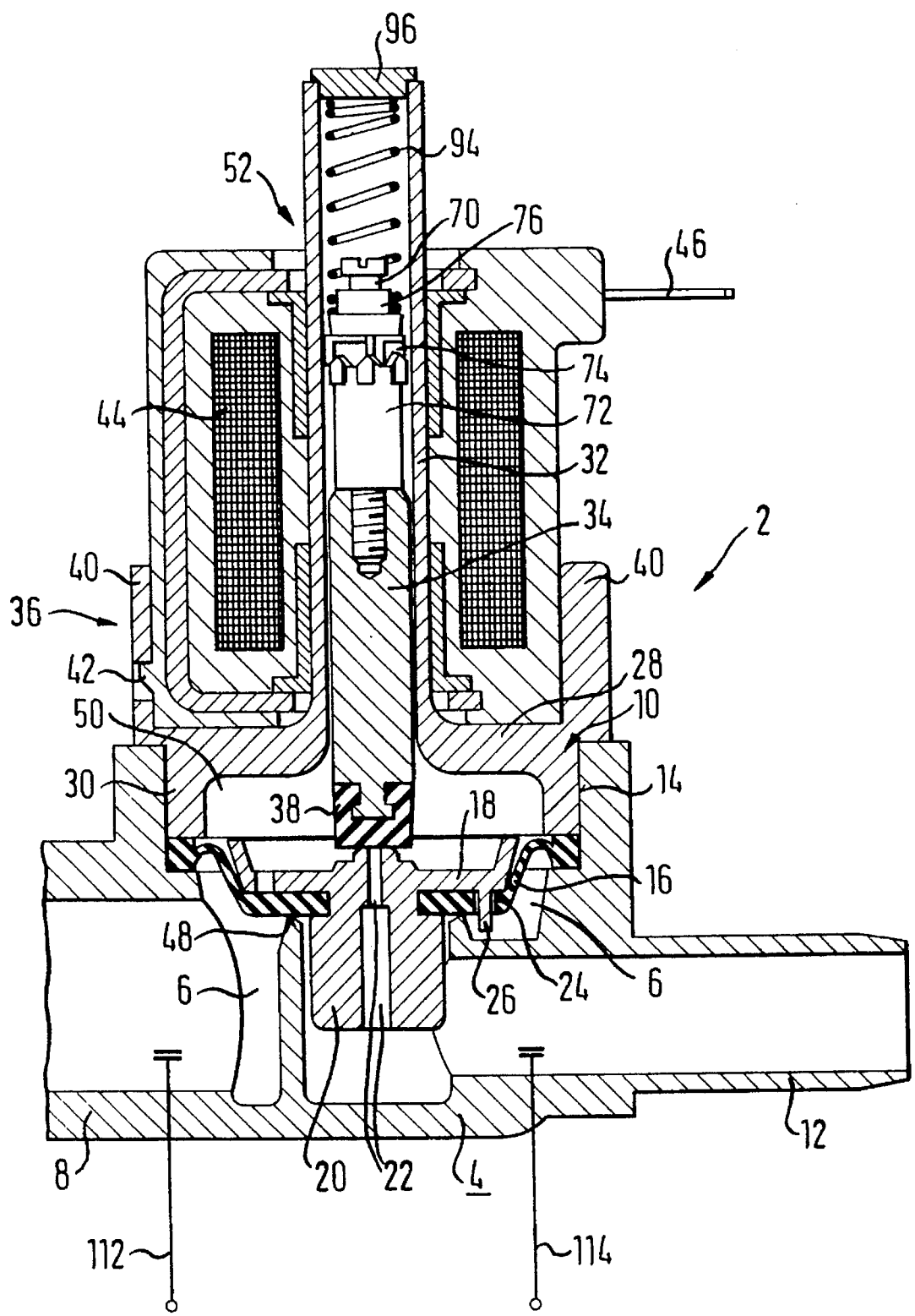
FIG. 1 shows a section through the respective solenoid valve which, in this example, has the form of a servo-assisted valve.
Figure 2:
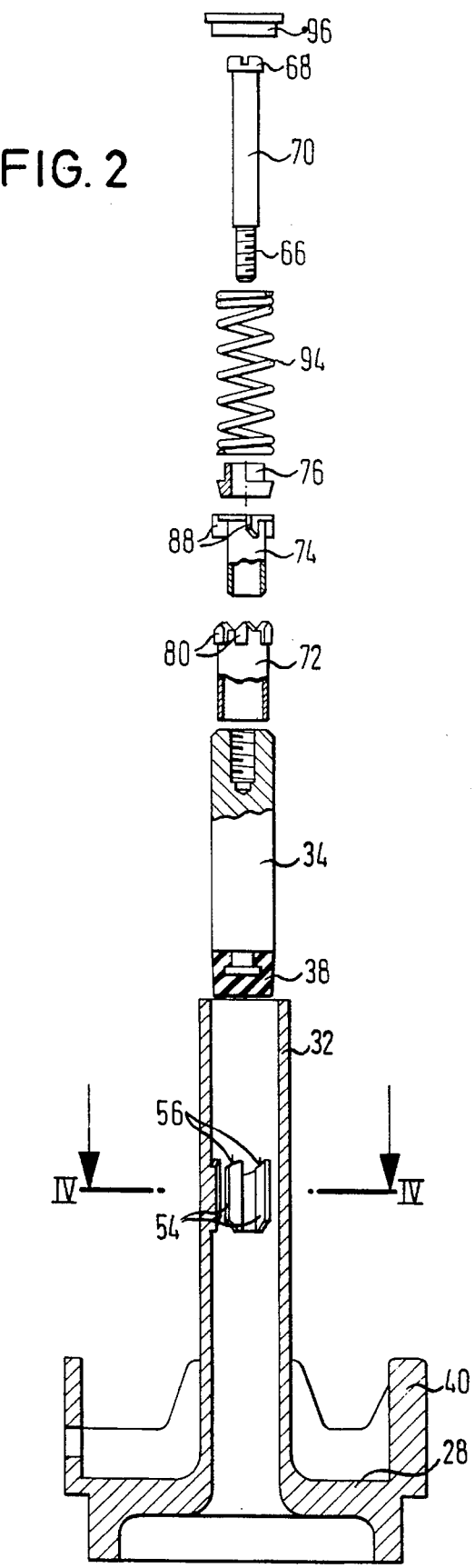
FIG. 2 shows an exploded view of the locking parts of the respective solenoid valve.
Figure 4:
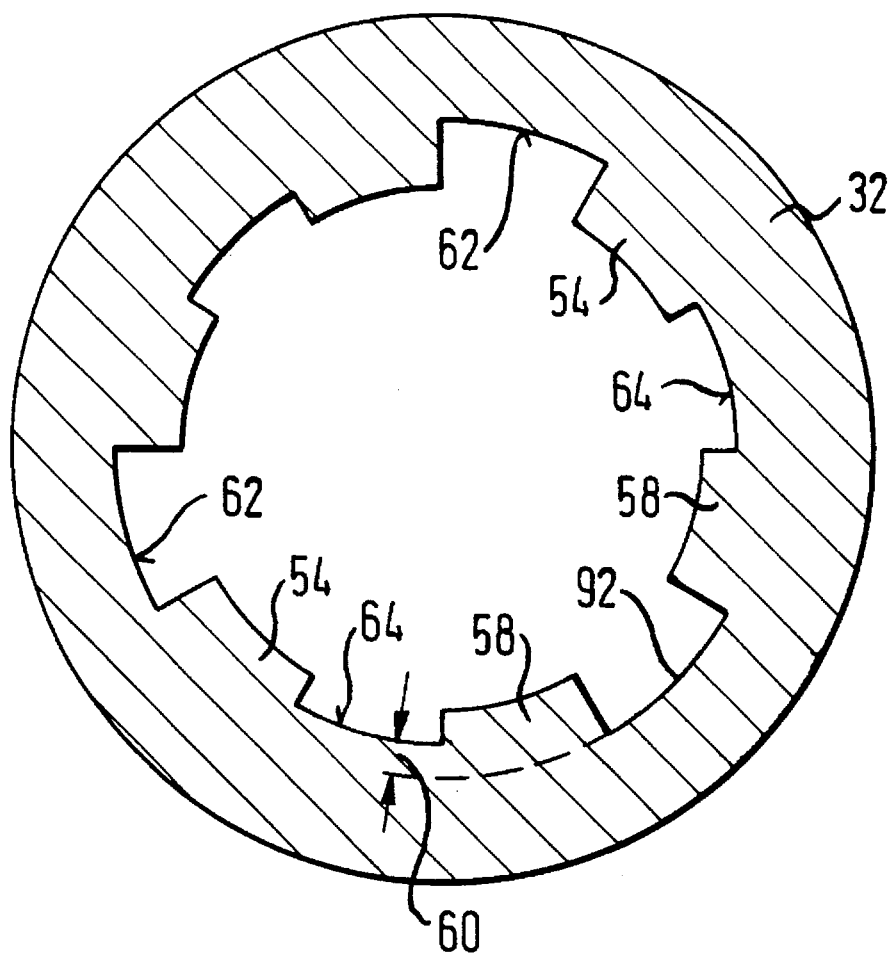
FIG. 4 shows a cross section through a core guide tube of the switching system according to line IV—IV in FIGS. 2 and 3.

The solenoid valve 2 shown, which may be used in conventional household washing machines as a water inlet valve, has a housing 4, which is open on one side, and a chamber 6 recessed in said housing. A short water inlet pipe 8 feeds into said chamber, and a short water outlet pipe 12 leads outwardly, and is angled toward the open housing side 10 and extends substantially equiaxially with the short water inlet pipe 8. A diaphragm 16, which consists of rubber or the like, is inserted in a shallow cylindrical recess 14 on the open housing side 10, said diaphragm being capable of resting with a substantial part of its area on a dish 18, which is loosely supported by the diaphragm. The dish 18 has a central attachment 20 reaching through the diaphragm 16 to the open housing side 10, said attachment having a narrow central through-extending bore 22. Furthermore, eccentrically with the attachment 20, the diaphragm 16 has within the zone of the dish 18 a small opening 24, through which a pin 26 projects loosely from the dish 18. The clear cross section of the opening 24 is smaller than the cross section of the through-bore 22.

By the cover 28, which is screwed to the housing 4 and which has an attachment 30 projecting in a fitted fashion into the cylindrical recess 14, the diaphragm is kept in its place in a sealing way. Coaxially with the attachment 30, the cover 28 has on the outer side a core guide tube 32, the latter forming one piece with the cover. An immersion core 34 of an electromagnetic switching system 36 is guided with axial movability in said tube. The immersion core 34 is subjected to a spring force, which tends to force said core against the diaphragm 16. At its end facing the diaphragm 16, the immersion core 34 supports a rubber cap 38, which forms a valve member for closing the through-bore 22 of the attachment 20 as a pilot valve.

A magnet winding 44 of the electromagnetic switching system 36, said winding being module-like and encapsulated, including its associated, stationary core parts, is inserted around the core guide tube 32 between suitable fitting and locking means—as, for example, 40 and 42—on the outer side of the cover 28, said magnetic winding being supplied via the connections 46 (which, in the figure, appear to be disposed one after the other).

To this extent, the described solenoid valve 2 is conventional. Its mode of operation is the one of a servo-valve. When the through-bore 22 is closed by the rubber cap 38, a greater force of pressure is generated via the opening 24 on the side of the diaphragm 16 facing the cover 28 due to the greater exposed area than on the side facing the chamber, causing the diaphragm 16 to be sealingly forced against the inside mouth 48 of the short water outlet pipe 12. This means the valve is closed. Now, when the immersion core 34 including the rubber cap 38 is lifted by actuating the electromagnetic switching system 36, water can exit from the space 50 on the side of the cover through the through-bore 22 and into the short water outlet pipe 12 at a rate higher than the rate at which such water can pass through the opening 24, with the result that the force of pressure acting on the diaphragm 16 on the side of the chamber 6 now predominates within a short time, and the diaphragm is lifted from the mouth 48 on the short water outlet pipe 12, i.e., the valve opens. The valve remains open as long as the rubber cap 38 remains lifted off the through-bore 22. When the through-bore 22 is closed, the original, closed condition of the valve is adjusted again.

Now, as opposed to such solenoid valves of the conventional type, the magnetic switching system 36 is a bistable one which, with short actuation pulses, can be alternately shifted to one or the other of its two switching conditions. More precisely stated, the immersion core 34 is alternately provided with a lifted and a release position, whereby in the latter position, it is forced against the diaphragm 16 by the spring force acting on it.

This is accomplished in that a locking mechanism 52 is attached to the end of the immersion core 34 that is averted from the diaphragm 16, said locking mechanism co-operating with stationary parts of the locking system in the form of a rim of six lengthwise extending strips 54 in the interior of the core guide tube 32. At their ends remote from the diaphragm 16, said strips 54 have the slanted faces 56 forming cam teeth, and a relative elevation 60 is present between each two successive strip pairs 58, so that the alternating deeper and flatter grooves 62 and 64, respectively, are present between the successive strips 54. The slanted faces 56 extend across the flatter grooves 64.

The locking mechanism 52 consists of a cylindrical bolt 70, which is screwed into the outside end of the immersion core 34, except for a suitable thread attachment 66 and a head 68 at the opposed, outer end. In the direction away from the immersion core 34, said bolt supports a hollow-cylindrical outer locking part 72, a locking sleeve 74 and a spring seat ring 76, said elements being arranged successively, but overlapping each other. Said spring seat ring is secured on the bolt 70 by the head 68. At least the parts 72, 74 and 76 consist of magnetically neutral material. Due to their arrangement in the core guide tube 32, which is open toward the diaphragm 16, said parts, like the immersion core 34, are surrounded by the fluid to be controlled as well, said fluid being water in the present example.

The outer locking part 72 surrounds a shaft segment 78 of the locking sleeve 74, in a way such that said sleeve is rotatably and longitudinally displaceably supported therein. At its end on the outer side, said locking part supports a crenelation-like rim of six radially and axially protruding cam teeth 80, which permanently come to rest in the grooves 62 and 64, respectively, and which are capable of axially sliding in said grooves. Viewed axially in the center plane of the teeth, approximately symmetric, slanted faces 82 and 84 of the teeth 80 extend into the gaps between the teeth, so that overall, a wall 86 of the outer locking part 72 is obtained that projects and is recessed on the face side approximately with a zigzag configuration.

At its outside end, the locking sleeve 74 has with a regular distribution the three radially outwardly projecting teeth 88, which, in the direction of the immersion core 34, have the slanted faces 90, which are inclined in the same sense. The inclination of the face 90 corresponds with the one of the slanted faces 56 and 84 on the strips 54 and the teeth 80, respectively. The radial height of the teeth 80 is such that said teeth reach down to the bottom of the deeper grooves 62; i.e., up to the inner wall 92 of the core guide tube 32. It is understood that the teeth 88 are prevented from entering the flatter grooves 64. On the face side, the teeth 88 are capable of resting and gliding on the slanted faces 56 of the strips 54, as well as on the wall 86 of the outer locking part 72. For this purpose, a spiral pressure spring 94 seated on the spring seat ring 76 presses the locking sleeve 74 in the direction of and against the diaphragm 16. The opposite end of the spring 94, said end reaching across the head 68 of the bolt 70, supports itself on a cap 96 of the tube 32.

Figure 5:
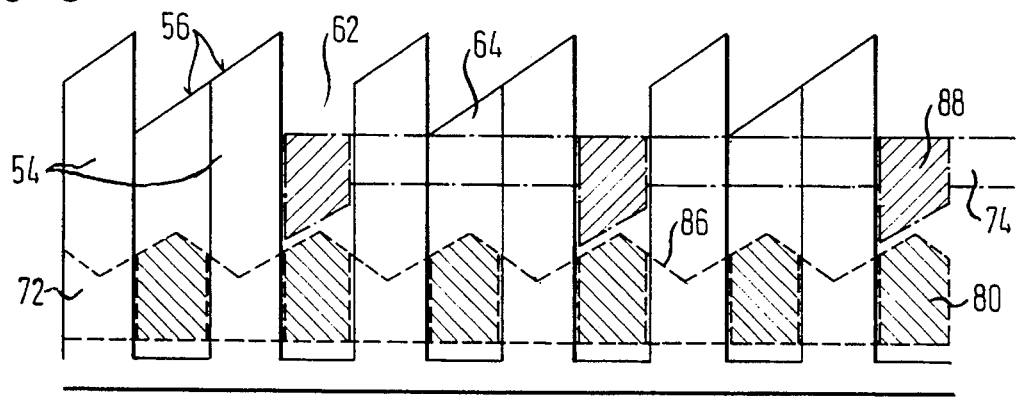
FIG. 5 to FIG. 7 show schematized views of the locking system in different operational phases, in each case as such phases occur.
Figure 6:
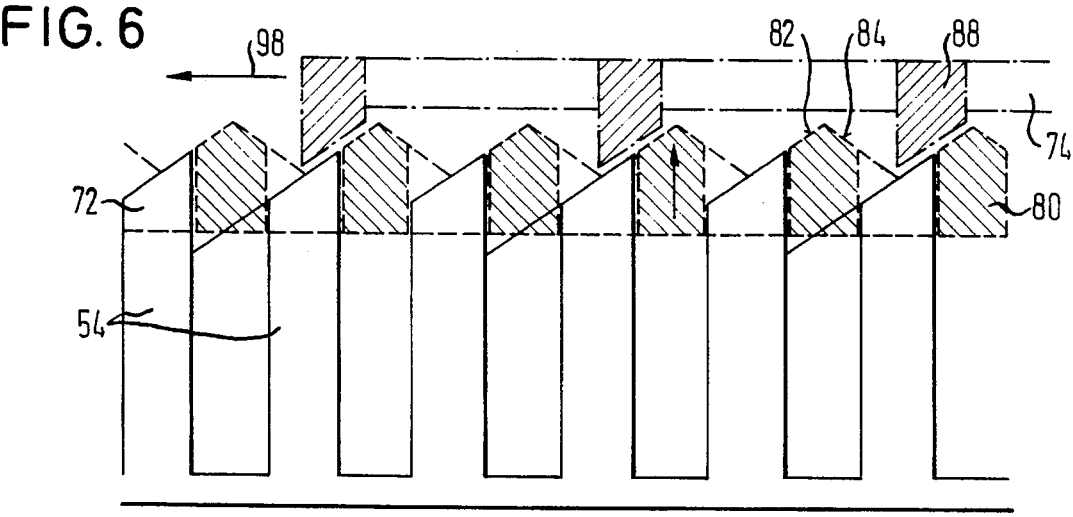
Figure 7:
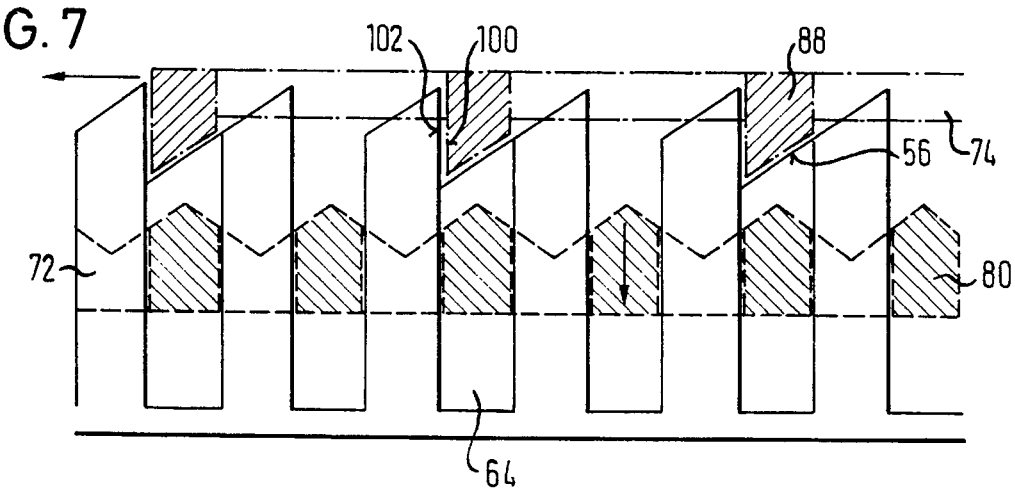

The function of the locking mechanism specified so far is described as follows: In a starting position (FIG. 5), in which the rubber cap 38 closes on the immersion core 34 the through-bore 22, the three teeth of the locking sleeve 74 are present in the deep grooves 62 within the zone of the strips 54. Now, when through excitation of the magnet winding 44, the immersion core 34 with the parts 72, 74 and 76 is lifted (FIG. 6), overcoming the force of the spring 94, the teeth 88 of the locking sleeve 74 exit from the grooves 62 and are capable of sliding on the outer locking part 72, which itself is prevented from any rotary motion by the continuing engagement of its teeth 80 with the grooves 62 and 64. This causes the locking sleeve 74 to perform a rotation according to the arrow 98 until the tips of the teeth 88 come to rest on the bottoms between the successive areas 82 and 84 in the gaps of the teeth 80 of the outer locking part 72. When the immersion core 34 is released due to cancellation of the excitation of the magnet winding 44, and compressed subsequently by the spring 94 (FIG. 7), the teeth 88 of the locking sleeve 74 now come to rest on the slanted faces 56 on the strips 54, which causes the locking sleeve 74 to perform another rotation until the flanks 100 of the teeth 88 abut the flanks 102 of the strips 54. However, the teeth 88 now come to rest above the flatter grooves 64, into which they cannot enter. In this way, the locking sleeve 74, and with it the immersion core 34 are prevented from returning into their starting position, and the locking mechanism is latched.

When the magnet winding 44 is excited again, the same processes take place again; however, the teeth 88 of the locking sleeve 74 then come to rest above the deeper grooves 62, into which they can enter; i.e., following cancellation of the respective excitation of the magnet winding 44, the parts 34, 38, 72, 74 and 76 return to their starting position (FIG. 5) under the action of the spring 94.

Since a clear allocation of each switching or controlling pulse to the desired switching condition would be lost in the event a wrong actuation of the switching system 36 described above might occur, provision is usefully made for an indicating circuit that determines the actually existing switching condition.

Figure 8:
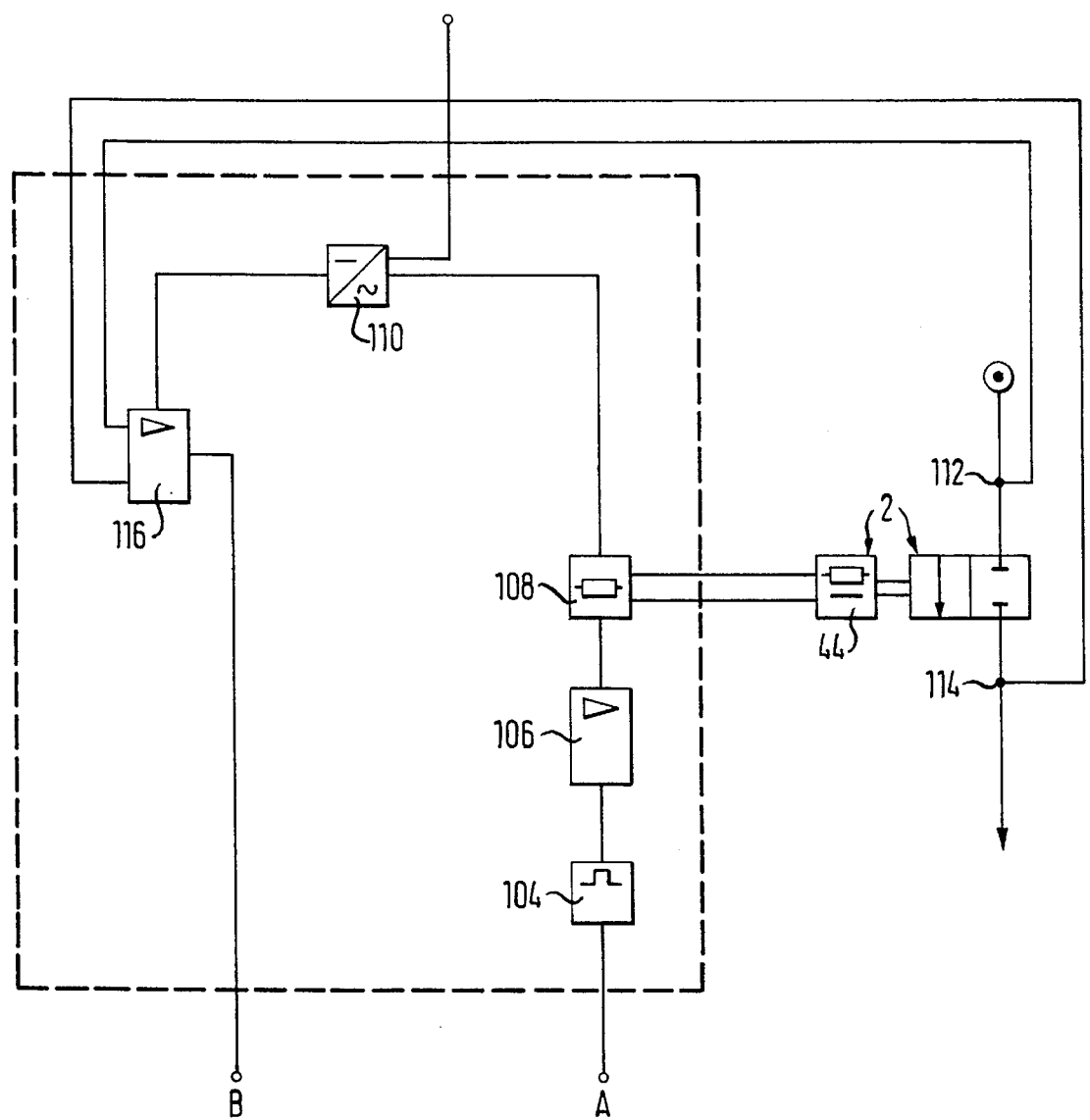
FIG. 8 shows a circuit diagram of an electrical indicating circuit applicable in connection with the claimed solenoid valve.

FIG. 8 shows an example of such an indicating circuit within a control circuit for the magnet winding 44 of the switching system 36. Said control circuit has a monostable flip-flop circuit 104 controlled for the respective control signal, said flip-flop circuit being followed by an amplifier 106, which controls a relay 108. In a first switching condition corresponding with the application of a control pulse on the input A, said relay 108 supplies a switching pulse to the magnet winding 44 in the form of an actuation ac-voltage from a voltage supply 110. Upon cancellation of the control pulse on the input A, the supply of the magnet winding 44 with the actuation ac by the relay 108 is interrupted.

Now, as indicated also in FIG. 1, the two sensor electrodes 112 and 114 are arranged on the short inlet pipe 8 and on the short outlet pipe 12 of the valve. Via said electrodes, the resistance to the electric conduction in the controlled medium—such as, for example water—is detected between said two points. The electrodes 112 and 114 are connected to the control input or a transistor amplifier 116, which additionally receives a dc voltage signal from the voltage supply. The electric resistance between the electrodes, which changes with the switching condition of the solenoid valve, causes in the amplifier 116 different voltage drops, which are reflected in the output signal on an output B of the respective indicating circuit.

More precisely stated, a signal with different voltage levels (high or low) is received on the output B, of which levels one has to be defined as the indicating signal for the displaced immersion core 34. The output B forms an interface for the connection of any desired alarm, control or regulating systems, for example for a standard repeat circuit, which, when a error actuation (no change in level received at output B) is determined, is capable of repeating —several times, if need be—the control pulse supplied to input A, and of emitting an alarm signal upon any unsuccessful repeat.

Figure 9:
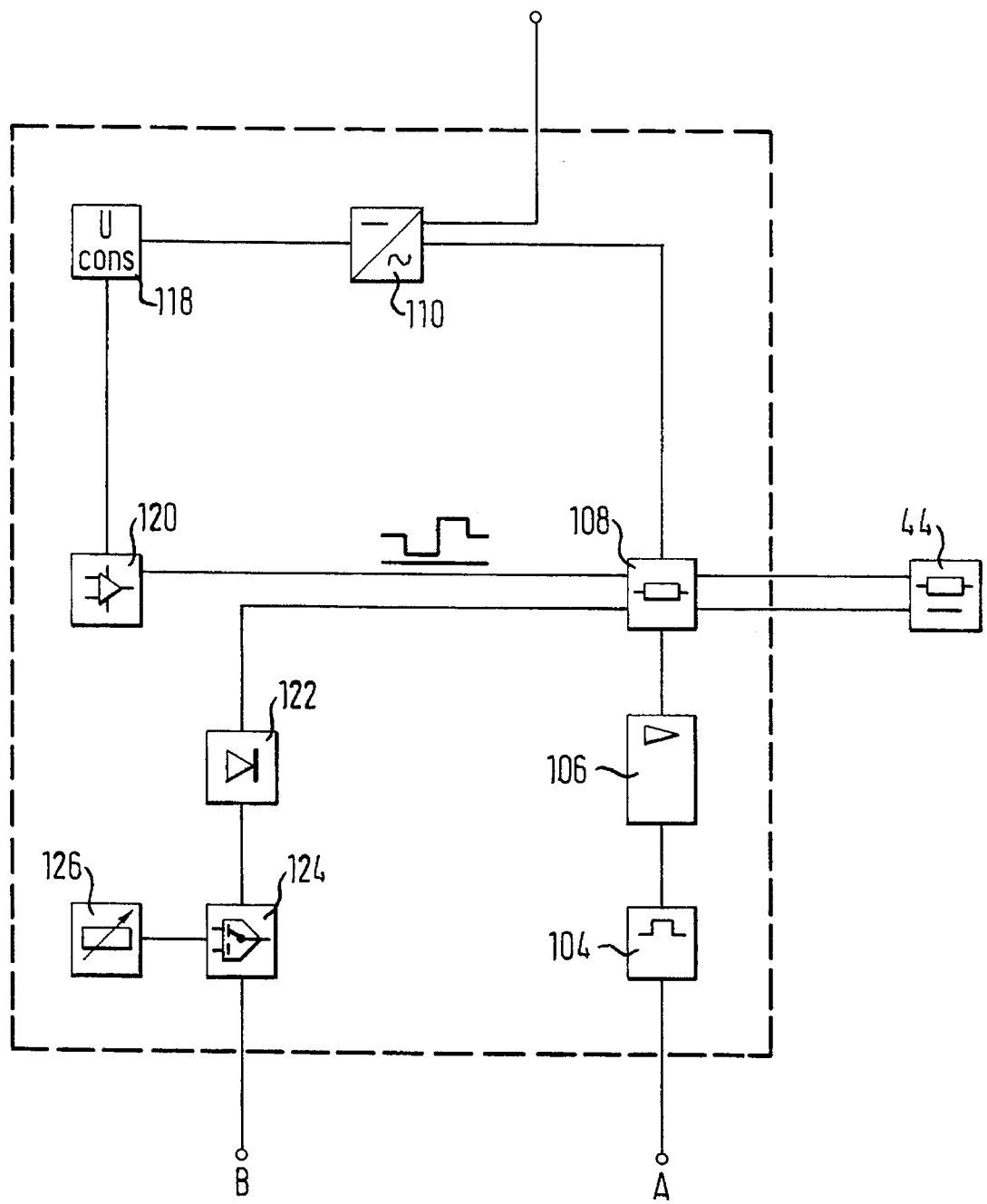
FIG. 9 shows a circuit diagram of such an indicating circuit of another type.

While the indicating circuit according to FIG. 8 requires that the switching system 36 to be monitored is limited to the use on a solenoid valve, the one according to FIG. 9 is independent thereof in that it detects the given switching condition by scanning the inductivity of the magnet winding 44, said inductivity changing with the position of the inversion core 34.

In this case, a square-wave voltage generator 120 supplied by the power supply 110 via a voltage stabilizer 118 supplies a continuous square-wave voltage signal of, for example 5000 Hz, and said signal is, upon return of the relay 108 to its starting position, applied to the magnet winding 44, said relay being designed as a reversing relay in the present case. Depending on the position of the immersion core 34 with respect to the magnet winding, the square-wave signal causes different voltage drops on said winding due to the change in impedance, and said voltage drops are, following rectification in a rectifier circuit 122, applied to the input of a comparator 124, with a reference voltage signal being applied to the second input of said comparator 124, said reference voltage signal being adjustable on a potentiometer 126. Now, depending on the result of the comparison, a signal reflecting the given switching condition of the switching system 36 now appears on the output B of the respective indicating circuit, which signal can be processed further in the same way as explained above in connection with FIG. 8.

It can be seen that the circuit parts framed in FIGS. 8 and 9 by dashed lines can be designed as interchangeable modules with respect to the control of the magnet winding 44.

The relay 108 and the magnet winding 44 must not necessarily be controlled by an ac-voltage: if desired, the respective switching pulses can be dc-voltage pulses. However, in no case do such pulses require in each case a change in polarity; also, their intensity is not critical.

Furthermore, it is understood that the locking mechanism of the switching system according to the invention can be designed also in a way other than the one described above, for example also in the way of the one specified in DE-PS 36 24 152. Moreover, the solenoid valve needs not to be one with a pilot valve. The fact is rather that for low pressure applications and/or low through-put rates of the medium to be controlled, it is possible to have the immersion core directly control the main flow-through, in the way it is normally done with such low rates. On the other hand, with high through-put rates, a pilot valve controlled by the switching system can be arranged also separately from a main valve, for example.

What is claimed is:

1. A valve having a valve chamber supporting a valve seat selectively engaged by a valve diaphragm for controlling the flow of a medium comprising a bistable, eletromagnetic solenoid valve including (i) a longitudinally-extending core guide tube having a first end opening towards the valve chamber and a second closed end, wherein said core guide tube is filled with the medium, (ii) a single electromagnetic winding surrounding said core guide tube, and (iii) an armature comprising a movable core disposed within said core guide tube for opening and closing said valve diaphragm, and (iv) a locking mechanism, coaxially located with respect to said movable core, within said core guide tube, said locking mechanism comprising:

(a) a first locking member longitudinally displaceable within said core guide tube;

(b) a second locking member longitudinally displaceable against said first locking member and means for rotating said second locking member in a lifted position through a preset angle, whereby said locking mechanism alternates between an engaged and a released state; and (c) a coil spring for biasing said second locking member and operating as a return spring for resetting said movable core into one of two stable positions corresponding to the engaged and released states and the open and closed positions of said valve diaphragm;

wherein successive excitation of said electromagnetic winding displaces said movable core to lift and rotate said second locking member so that said locking mechanism is alternately engaged and released with said coil spring resetting said movable core to open and close the valve to control the flow of the medium.

2. The valve according to claim 1, wherein said locking members and said coil spring are disposed on a side of said movable coil opposite the valve diaphragm with said coil spring located farthest from the valve diaphragm.

3. The valve according to claim 1, wherein said movable core includes an axial extension made from an insulating material, wherein said locking members are positioned on said axial extension.

4. The valve according to claim 1, wherein said rotating means comprises guide elements molded onto an inside of said core guide tube for rotatably guiding said second locking member during longitudinal displacement thereof.

5. The valve according to claim 1, wherein said locking members and said core guide tube are made from a polyamide insulating material having low sliding friction characteristics.

6. The valve according to claim 5, wherein the insulating material is fiber-reinforced material.

7. The valve according to claim 1, comprising a valve cover, wherein said core guide tube is molded onto said valve cover.

8. The valve according to claim 7, wherein said electromagnetic winding is an encapsulated module, and wherein said valve cover includes locking means for releasably locking said encapsulated module in place.

9. The valve according to claim 1, wherein the valve diaphragm is servo-assisted by pressure from the medium.

10. The valve according to claim 1, comprising a circuit for indicating the position of said valve diaphragm.

11. The valve according to claim 10, wherein said circuit detects continuity of an electrically-conductive medium between an inlet and an outlet of the valve.

12. The valve according to claim 10, wherein said circuit detects inductance of said electromagnetic winding which depends upon the position of said movable core.

13. The valve according to claim 1, comprising a diaphragm insert disposed centrally within the valve diaphragm and including a pilot aperture therethrough which is selectively opened and closed by said movable core.

* * * * *